United States Patent
Szczepanski et al.

(10) Patent No.: US 10,087,799 B2
(45) Date of Patent: Oct. 2, 2018

(54) EXHAUST DEVICE AND METHOD OF MANUFACTURING AN EXHAUST DEVICE WITH A THERMALLY ENHANCED SUBSTRATE

(71) Applicant: DENSO International America, Inc., Southfield, MI (US)

(72) Inventors: Edward Szczepanski, Grosse Pointe Woods, MI (US); Patrick Powell, Farmington Hills, MI (US)

(73) Assignee: DENSO International America, Inc., Southfield, MI (US)

( * ) Notice: Subject to any disclaimer, the term of this patent is extended or adjusted under 35 U.S.C. 154(b) by 385 days.

(21) Appl. No.: 14/789,155

(22) Filed: Jul. 1, 2015

(65) Prior Publication Data

US 2017/0002706 A1  Jan. 5, 2017

(51) Int. Cl.
| | |
|---|---|
| B01D 50/00 | (2006.01) |
| F01N 3/033 | (2006.01) |
| F01N 3/20 | (2006.01) |
| F01N 3/022 | (2006.01) |
| H05B 3/00 | (2006.01) |
| H05B 1/02 | (2006.01) |
| B29K 103/06 | (2006.01) |
| B29K 105/00 | (2006.01) |
| B33Y 10/00 | (2015.01) |
| B33Y 80/00 | (2015.01) |

(52) U.S. Cl.
CPC ........... *F01N 3/033* (2013.01); *F01N 3/0224* (2013.01); *F01N 3/2026* (2013.01); *H05B 1/0202* (2013.01); *H05B 3/0014* (2013.01); *B29K 2103/06* (2013.01); *B29K 2105/251* (2013.01); *B33Y 10/00* (2014.12); *B33Y 80/00* (2014.12)

(58) Field of Classification Search
None
See application file for complete search history.

(56) References Cited

U.S. PATENT DOCUMENTS

| | | | | |
|---|---|---|---|---|
| 4,505,726 A | * | 3/1985 | Takeuchi | B01D 46/2407 422/174 |
| 4,516,993 A | * | 5/1985 | Takeuchi | B01D 46/0063 422/178 |

(Continued)

FOREIGN PATENT DOCUMENTS

| | | |
|---|---|---|
| JP | 2009274479 A | 11/2009 |
| JP | 2014177890 A | 9/2014 |

*Primary Examiner* — Amber R Orlando
(74) *Attorney, Agent, or Firm* — Harness, Dickey & Pierce, P.L.C.

(57) ABSTRACT

The present teachings provide for an exhaust system device including a substrate body, a pair of electrical leads, and a resistance heating element. The substrate body can include a plurality of first walls that can extend between an upstream end and a downstream end of the substrate body. The substrate body can include a plurality of second walls that can be transverse to the first walls and can extend between the upstream end and the downstream end. The first and second walls can define a plurality of channels. The pair of electrical leads can be configured to be coupled to a power source. The resistance heating element can be disposed within or on at least one of the first or second walls and can be electrically coupled to the electrical leads to receive power from the electrical leads.

9 Claims, 4 Drawing Sheets

(56) References Cited

U.S. PATENT DOCUMENTS

| | | | | |
|---|---|---|---|---|
| 4,872,889 A * | 10/1989 | Lepperhoff | F01N 3/0222 | 55/282 |
| 4,934,142 A * | 6/1990 | Hayashi | B01D 53/9472 | 422/169 |
| 5,144,798 A * | 9/1992 | Kojima | F01N 3/027 | 55/466 |
| 5,171,335 A * | 12/1992 | Kojima | F01N 3/0211 | 55/523 |
| 5,194,229 A * | 3/1993 | Abe | F01N 3/2026 | 219/552 |
| 5,457,945 A * | 10/1995 | Adiletta | B01D 46/0063 | 55/301 |
| 6,090,172 A * | 7/2000 | Dementhon | B01D 46/0063 | 55/282.3 |
| 6,176,896 B1 * | 1/2001 | Dementhon | B01D 46/0063 | 55/282.3 |
| 6,572,682 B2 * | 6/2003 | Peter | B01D 46/0063 | 55/282.2 |
| 6,817,174 B1 * | 11/2004 | Igarashi | F01N 3/0231 | 60/278 |
| 7,686,857 B2 * | 3/2010 | Gonze | B01D 46/0063 | 55/282.3 |
| 7,901,475 B2 * | 3/2011 | Gonze | F01N 3/0222 | 422/169 |
| 8,112,990 B2 | 2/2012 | Gonze et al. | | |
| 8,444,729 B2 * | 5/2013 | Bailey | B01D 46/0021 | 422/169 |
| 8,511,069 B2 * | 8/2013 | Gonze | F01N 3/027 | 60/273 |
| 8,671,668 B2 * | 3/2014 | Gonze | F01N 3/027 | 55/282.3 |
| 8,950,177 B2 * | 2/2015 | Gonze | F01N 3/027 | 60/273 |
| 2007/0062181 A1 * | 3/2007 | Williamson | F01N 3/0222 | 60/297 |
| 2009/0071126 A1 | 3/2009 | Gonze et al. | | |
| 2011/0000194 A1 * | 1/2011 | Gonze | F01N 3/027 | 60/286 |

* cited by examiner

EXHAUST DEVICE AND METHOD OF MANUFACTURING AN EXHAUST DEVICE WITH A THERMALLY ENHANCED SUBSTRATE

FIELD

The present disclosure relates to an exhaust device and a method of manufacturing an exhaust device with a thermally enhanced substrate.

BACKGROUND

This section provides background information related to the present disclosure which is not necessarily prior art.

An internal combustion engine "ICE" (e.g. gasoline or diesel) typically includes an exhaust device (e.g. a particulate matter filter and/or a catalytic converter) that includes a substrate having a plurality of channels through which exhaust gasses can flow.

Filter substrates (e.g. in a particulate matter filter) can filter particulate matter (e.g. soot) out of the exhaust gasses before the exhaust gasses are emitted to the atmosphere. Filter substrates are typically a ceramic (e.g. cordierite) block that is extruded to have a plurality of small, parallel passageways which have walls that are permeable to gasses while being configured to trap particulate matter.

Particulate matter can build up on these filter substrates, which can restrict exhaust flow and cause undesired back pressure. This buildup of particulate matter can be non-uniform throughout the filter substrate and can result in decreased fuel efficiency and power of the ICE. Buildup of particulate matter on the filter substrate can be reduced by increasing the temperature of the particulate matter to a light-off temperature in a process known as regeneration.

When regeneration is needed, an increased volume of fuel is typically delivered into the ICE's combustion chamber to cause the temperature of the exhaust gasses to increase. Once the temperature of the particulate matter reaches the light-off temperature, an exothermic reaction burns off the captured particulate matter. This method heats the entire filter substrate and can result in decreased fuel efficiency.

Similarly, catalytic substrates can reduce undesirable exhaust emissions (e.g. carbon monoxide "CO", unburned hydrocarbons "HC", nitrogen oxides "NOx") by catalyzing chemical reactions to create more desirable emissions (e.g. carbon dioxide "CO2", water "H2O", nitrogen gas "N2"). Catalytic substrates are typically a ceramic (e.g. cordierite) block that is similarly extruded to have a plurality of small, parallel passageways. The ceramic block and passageways are typically coated with a material that catalyzes the chemical reactions necessary to achieve the more desirable emissions. In some applications, the catalytic substrate can also act as the particulate substrate. The coated catalytic substrate generally must be above a certain temperature (i.e. a light-off temperature) to efficiently catalyze the chemical reactions.

Typically, when the catalytic substrate is below the light-off temperature (e.g. after a cold start), an increased volume of fuel is delivered into the ICE's combustion chamber to cause the temperature of the exhaust gasses to increase. This method heats the entire catalytic substrate and can result in decreased fuel efficiency.

SUMMARY

This section provides a general summary of the disclosure, and is not a comprehensive disclosure of its full scope or all of its features.

The present teachings provide for an exhaust system device including a substrate body, a pair of electrical leads, and a resistance heating element. The substrate body can include a plurality of first walls that can extend between an upstream end and a downstream end of the substrate body. The substrate body can include a plurality of second walls that can be transverse to the first walls and can extend between the upstream end and the downstream end. The first and second walls can define a plurality of channels. The pair of electrical leads can be configured to be coupled to a power source. The resistance heating element can be disposed within or on at least one of the first or second walls and can be electrically coupled to the electrical leads to receive power from the electrical leads.

The present teachings further provide for an exhaust system device including a substrate body and a heat transfer member. The substrate body can include a plurality of first walls that can extend between an upstream end and a downstream end of the substrate body. The substrate body can include a plurality of second walls that can intersect with the first walls and can extend between the upstream end and the downstream end. The first and second walls can define a plurality of channels. The heat transfer member can be formed of a material that is more thermally conductive than the substrate body and can be disposed within at least one of the first and second walls.

The present teachings provide for a method of manufacturing a substrate body of an exhaust device. The method can include depositing a first layer of the substrate body. Depositing the first layer of the substrate body can include depositing a first layer of substrate particles. Depositing the first layer of the substrate body can include depositing a first layer of conductive particles. The method can include depositing a second layer of the substrate body onto the first layer of the substrate body. Depositing the second layer of the substrate body can include depositing a second layer of substrate particles onto the first layer of the substrate body. The first and second layers of substrate particles can cooperate to define a plurality of channels. Depositing the second layer of the substrate body can include depositing a second layer of conductive particles onto the first layer of the substrate body and in contact with the first layer of conductive particles. The first and second layers of conductive particles can define a conductive member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present teachings are directed to an exhaust system device and a method of manufacturing an exhaust system device having a substrate and a thermally enhancing element disposed within the substrate. The substrate defines a plurality of channels through which exhaust gas can flow. The thermally enhancing element can extend longitudinally and/or laterally through the substrate relative to the channels. The thermally enhancing element can be thermally conductive and/or can include an electrical resistance heating element. The substrate and thermally enhancing element can be three-dimensionally printed together such that the thermally enhancing element can be located at any desirable location within the substrate.

Figure 1:
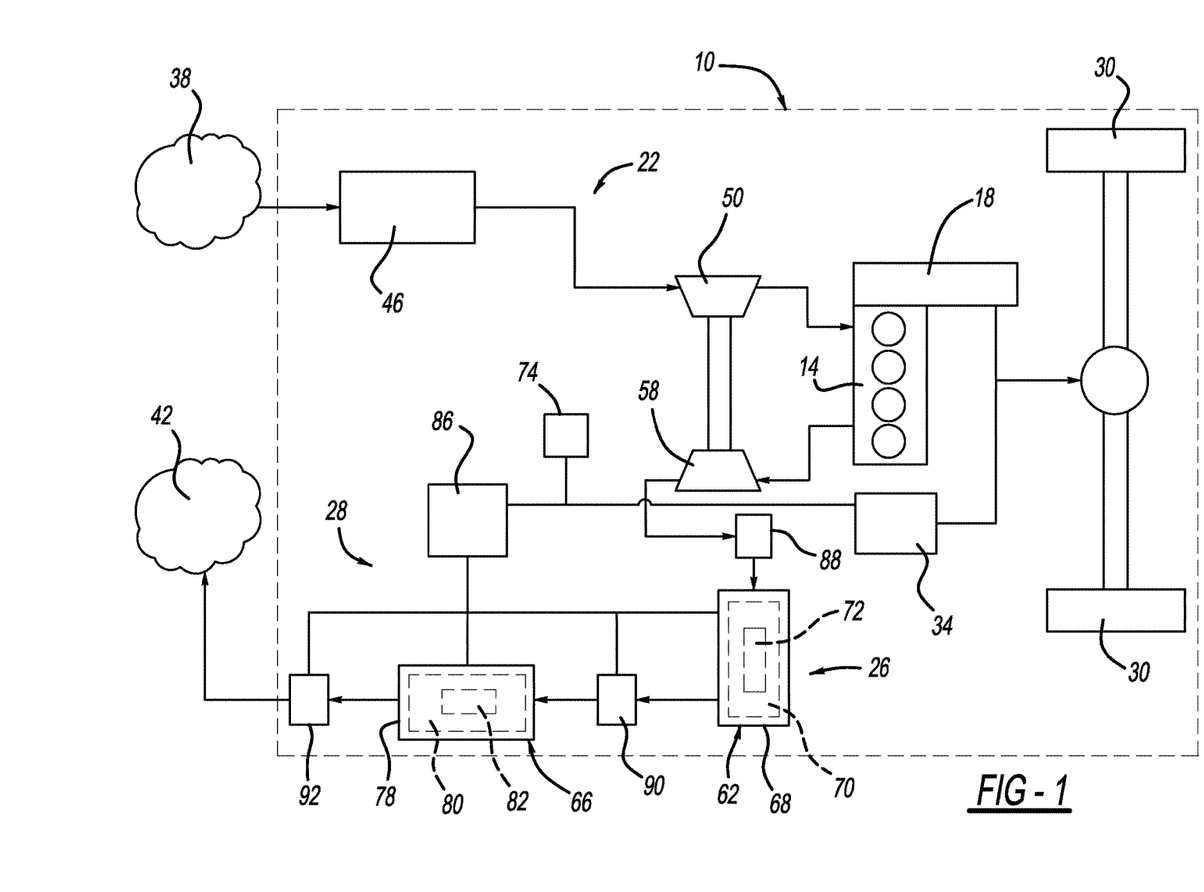
FIG. 1 is a schematic view of a vehicle including an exhaust system device in accordance with the present teachings.

With reference to FIG. 1, a vehicle 10 and an internal combustion engine ("ICE") 14 are schematically illustrated. In the example provided, the ICE 14 is configured to propel the vehicle 10, though it is appreciated that the present teachings can apply to other configurations or applications of an ICE (e.g. stationary machinery or equipment). In the example provided the vehicle 10 includes the ICE 14, a transmission 18, an intake system 22, an exhaust system 26, a control system 28, and a set of drive wheels 30. The vehicle 10 can also include a secondary power plant 34.

The ICE 14 can be any suitable type of ICE such as a gasoline, diesel, ethanol, or natural gas engine for example. While illustrated schematically as a piston-cylinder type engine, the ICE 14 can be any suitable construction such as a turbine, rotary or Wankel engine for example. The ICE 14 can receive intake air 38 (e.g. from the atmosphere outside the vehicle 10) through the intake system 22, and can expel exhaust gas 42 (e.g. to the atmosphere outside the vehicle 10) through the exhaust system 26. In the example provided, the intake system 22 can include an intake filter 46 and a compressor 50, though other configurations can be used. The intake filter 46 can be configured to filter dust and debris from the intake air 38 before the intake air 38 enters the ICE 14. The compressor 50 can be configured to compress the intake air 38 before the intake air 38 enters the ICE 14.

The ICE 14 can combust fuel (not shown) with the intake air 38 to provide rotary power to the transmission 18. The transmission 18 can be any suitable type of transmission and can be drivingly coupled to the drive wheels 30 to provide rotary power to the drive wheels 30. The combustion products can be expelled from the ICE 14 through the exhaust system 26 to the atmosphere (e.g. exhaust gas 42).

In the example provided, the exhaust system 26 can include a turbine 58, a first exhaust device or catalytic converter 62, and a second exhaust device or particulate filter 66. The flow of combustion products through the exhaust system 26 can rotate the turbine 58 which can be drivingly coupled to the compressor 50.

The combustion products can flow through the catalytic converter 62 before being expelled from the exhaust system 26. The catalytic converter 62 can be configured to reduce the amount of undesirable exhaust emissions (e.g. carbon monoxide "CO", unburned hydrocarbons "HC", nitrogen oxides "NOx") in the exhaust gas 42 by catalyzing chemical reactions of the combustion products to create more desirable emissions (e.g. carbon dioxide "CO2", water "H2O", nitrogen gas "N2").

The catalytic converter 62 can include a housing 68, a catalytic substrate body 70, and a heating device 72. The heating device 72 can be electrically coupled to an electrical power source 74 (e.g. a battery) and can be configured to heat the catalytic substrate body 70. The catalytic substrate body 70 can be coated with a catalyst (not specifically shown) and constructed to permit the exhaust gasses to flow through the catalytic substrate body 70 and in contact with the catalyst to catalyze the chemical reactions. The catalytic substrate body 70 and heating device 72 are discussed in greater detail below.

The combustion products can flow through the particulate filter 66 before being expelled from the exhaust system 26. The particulate filter 66 can be configured to capture and reduce the amount of particulate matter (e.g. soot) in the exhaust gas 42 by filtering the particulate matter out of the exhaust gas 42 before it exits the exhaust system 26.

The particulate filter 66 can include a housing 78, a filter substrate body 80, and a heating device 82. The heating device 82 can be electrically coupled to the electrical power source 74 and can be configured to heat the filter substrate body 80. The filter substrate body 80 can be constructed to permit the exhaust gasses to flow through the filter substrate body 80 while trapping particulate matter. The filter substrate body 80 and heating device 82 are discussed in greater detail below.

In an alternative construction, the catalytic converter 62 and the particulate filter 66 can be a single device having a housing, a substrate, and a heating device as described in greater detail below.

The secondary power plant 34 can be drivingly coupled to the drive wheels 30 or to the transmission 18 to provide rotary power to the drive wheels 30. The secondary power plant 34 can be an electric motor that can receive electrical power from the electrical power source 74. The secondary power plant 34 can be configured to provide rotary power to the drive wheels 30 independently of the ICE 14 and can provide rotary power to the drive wheels 30 when the ICE 14 is not operating. It is understood that the secondary power plant 34 can also be configured to supplement the power provided by the ICE 14 when the ICE 14 is operating.

The control system 28 can include a control module 86, a first sensor 88, a second sensor 90, and a third sensor 92. The control module 86 can be electrically coupled to the electrical power source 74 and can control electrical power supplied to the heating devices 72 and 82. The control module 86 can be electrically coupled to the first, second, and third sensors 88, 90, 92 to receive signals therefrom. The first, second, and third sensors 88, 90, 92 can be any suitable type of sensor such as pressure or temperature sensors for example.

In the example provided, the first sensor 88 is a temperature sensor and is disposed upstream of the catalytic converter 62, though other configurations can be used. For example, the first sensor 88 could be disposed within the catalytic converter 62 or downstream of the catalytic converter 62. Thus, the first sensor 88 can measure the temperature of the exhaust gasses flowing through the catalytic converter 62 and/or the temperature of the catalytic substrate body 70. While not specifically shown, the first sensor 88 can include a plurality of sensing elements that can sense temperatures at multiple locations to determine a temperature distribution across and/or within the catalytic substrate body 70.

In the example provided, the second and third sensors 90, 92 are pressure sensors, though other configurations can be used. In the example provided, the second sensor 90 is disposed upstream of the particulate filter 66 and downstream of the catalytic converter 62, and the third sensor 92 is disposed downstream of the particulate filter 66, though other configurations can be used. Thus, the second and third sensors 90, 92 can measure a pressure drop of the exhaust gasses across the particulate filter 66. While not specifically shown, the second and third sensors 90, 92 can include a plurality of sensing elements that can sense pressure drops at multiple locations to determine a pressure drop distribution across and/or within the filter substrate body 80.

Figure 2:
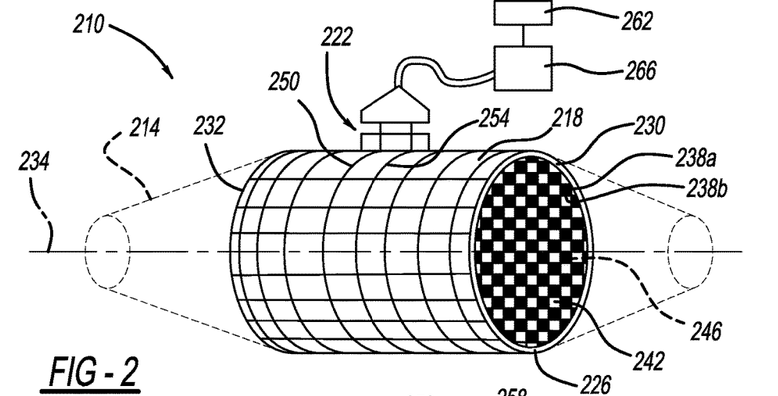
FIG. 2 is a perspective view of a portion of an exhaust system device similar to the exhaust system device of FIG. 1, illustrating a substrate of the exhaust system device.

With reference to FIG. 2, an example of an exhaust device 210 is illustrated. In the example provided, the exhaust device 210 is a combined catalytic converter and particulate filter, though other configurations can be used. For example, the exhaust device 210 can be similar to either the catalytic converter 62 (FIG. 1), or the particulate filter 66 (FIG. 1). The exhaust device 210 can include a housing 214, a substrate body 218, and a heating device 222. The housing 214 can be similar to either of the housings 68, 78 (FIG. 1). In the example provided, the substrate body 218 is a combined catalytic and particulate filter substrate body, similar to both the catalytic substrate body 70 (FIG. 1) and the filter substrate body 80 (FIG. 1), though other configurations can be used. For example, the substrate body 218 can be similar to either one of the catalytic substrate body 70 (FIG. 1), or the filter substrate body 80 (FIG. 1) individually.

In the example provided, the substrate body 218 is a cylinder having a generally round perimeter 226, though other configurations can be used. For example, the substrate body 218 can have a generally ovoid, rectangular, or polygonal cross-sectional shape. The substrate body 218 can have an upstream side 230 and a downstream side 232 and can be positioned in the housing 214 such that exhaust gasses flow along a flow axis 234 to enter the substrate body 218 at the upstream side 230 and exit at the downstream side 232. The substrate body 218 can include a plurality of walls 238a, 238b that define a plurality of first channels 242 and a plurality of second channels 246. The substrate body 218 and walls 238a, 238b can be generally formed of a ceramic material (e.g. cordierite). In the example provided, the walls 238a, 238b include (or are coated in) a catalyst material (not specifically shown) that is configured to catalyze reactions between the combustion products to produce more desirable emissions as described above with reference to the catalytic converter 62 (FIG. 1).

The first channels 242 can be open at the upstream side 230 and plugged at the downstream side 232 and can extend between the upstream and downstream sides 230, 232, though other configurations can be used. The second channels 246 can be open at the downstream side 232 and plugged at the upstream side 230 and can extend between the upstream and downstream sides 230, 232, though other configurations can be used. In an alternative construction, not specifically shown, neither the first channels 242 nor the second channels 246 are plugged on one of the sides (i.e. one of the upstream or downstream sides 230, 232), and only the first channels 242 are plugged on the opposite side (i.e. the other of the upstream or downstream sides 230, 232).

The first channels 242 can be adjacent to a plurality of the second channels 246. Adjacent ones of the first and second channels 242, 246 can share at least one common wall 238a, 238b. In the example provided, walls 238a, 238b are transverse to each other such that the first and second channels 242, 246 have generally rectangular or square cross-sections, though other configurations can be used (e.g. circular, polygonal).

The walls 238a, 238b that are shared between the first and second channels 242, 246 can be permeable to exhaust gasses (shown by arrow 248) to permit the exhaust gasses 248 to flow through the walls and impermeable or less permeable to particulate matter to trap particulate matter. Thus, the exhaust gasses 248 can enter the substrate body 218 at the upstream side 230 via the first channels 242 and can pass through the common walls 238a, 238b into the second channels 246, where the exhaust gasses 248 can exit the substrate body 218 at the downstream side 232 via the second channels 246. Thus, the particulate matter (not specifically shown) can become trapped on or in the common walls 238a, 238b that are between the first and second channels 242, 246.

Figure 3:
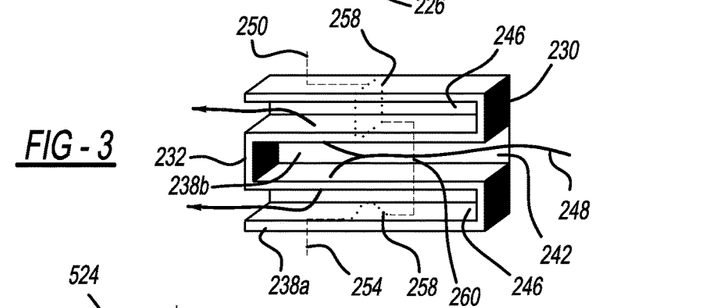
FIG. 3 is a cut-away perspective view of a portion of the substrate of FIG. 2.

With specific reference to FIGS. 2 and 3, the heating device 222 can include a first lead 250, a second lead 254, and at least one resistance heating element 258. The heating device 222 can also include at least one intermediate lead 260. The heating device 222 can also include additional leads (not specifically shown). The first and second leads 250, 254 can be electrically coupled to a power source 262 that can be similar to the electrical power source 74 (FIG. 1) and electrical power from the power source 262 can be controlled by a control module 266 that can be similar to the control module 86 (FIG. 1). The first and second leads 250, 254 can be partially disposed about the perimeter 226. The first and second leads 250, 254 can extend generally inward from the perimeter 226 and can be disposed within or on the walls 238a, 238b as discussed in greater detail below.

The first, second, and intermediate leads 250, 254, 260 can be formed of any suitable electrically conductive material (e.g. copper), can have a relatively low electrical resistance, and can be generally wire-like continuous electrical pathways. The first, second, and intermediate leads 250, 254, 260 can also be thermally conductive. The resistance heating elements 258 can be formed of any suitable electrically conductive heating element or resistor material (e.g. Nichrome, metal-ceramic composites). The resistance heating elements 258 can have an electrical resistance that is higher than the resistance of the first, second, and intermediate leads 250, 254, 260 and can be generally wire-like continuous electrical pathways. The resistance heating elements 258 can be configured to generate heat when electricity flows through the resistance heating element 258. The resistance heating elements 258 can be thermally conductive.

The resistance heating elements 258 can electrically couple the first and second leads 250, 254 within the substrate body 218. The intermediate leads 260 can electrically couple resistance heating elements 258 that are spaced apart from one another in a series or parallel electrical arrangement. The intermediate leads 260 and the resistance heating elements 258 can be located generally inward of the perimeter 226 and can be disposed entirely, or partially within or on the walls 238a, 238b.

In FIG. 3, example paths of the first, second, and intermediate leads 250, 254, 260 through the walls 238a, 238b are indicated by dashed lines and example paths of the resistance heating elements 258 are indicated by dotted lines. In the example provided, the first, second, and intermediate leads 250, 254, 260 and the resistance heating elements 258 can be entirely surrounded or encased in the walls 238a, 238b, though other configurations can be used. For example, the first, second, and/or intermediate leads 250, 254, 260 and/or the resistance heating elements 258 can form a portion of an interior surface of the walls 238a, 238b.

The first, second, and intermediate leads 250, 254, 260 and the resistance heating elements 258 can extend in any direction along the walls 238a, 238b. Some portions of the first, second, or intermediate leads 250, 254, 260 or the resistance heating elements 258 can extend in different directions from other portions of the first, second, or intermediate leads 250, 254, 260 or the resistance heating elements 258, respectively. For example portions of the first, second, or intermediate leads 250, 254, 260 or the resistance heating elements 258 can extend longitudinally with respect to the flow axis 234 and other portions can extend transverse to the flow axis 234. It is understood that the paths and locations of the first, second, and intermediate leads 250, 254, 260 and the resistance heating elements 258 illustrated in FIG. 3 are non-limiting examples of possible pathways or locations throughout the walls 238a, 238b.

Figure 4:
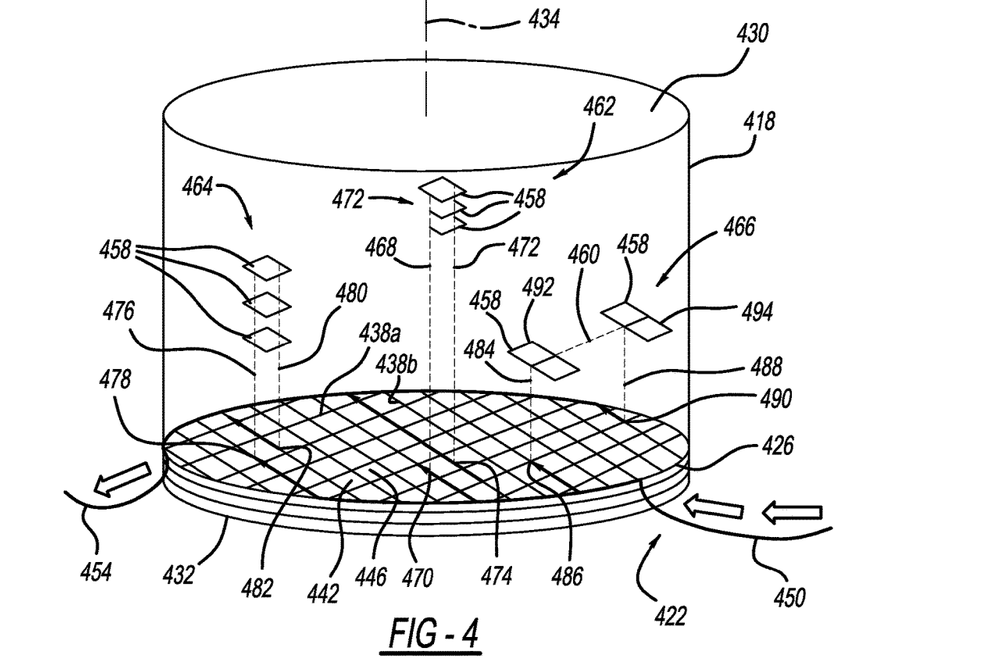
FIG. 4 is a perspective view of a portion of another exhaust system device similar to the exhaust system device of FIG. 2.

FIG. 4 illustrates a portion of an exhaust device 410 that can be similar to the exhaust device 210 (FIGS. 2 and 3), or either of the catalytic converter 62 (FIG. 1) or the particulate filter 66 (FIG. 1). The exhaust device 410 can include a substrate body 418 and a heating device 422 that can be similar to the substrate body 218 and heating device 222 described above with reference to FIGS. 2 and 3. The substrate body 418 can have a perimeter 426, an upstream side 430, a downstream side 432 and a flow axis 434, similar to the perimeter 226, upstream side 230, downstream side 232, and flow axis 234 described above with reference to FIG. 2. The substrate body 418 can include a plurality of walls 438 that define a plurality of first and second channels 442, 446, that can be similar to the walls 238a, 238b and first and second channels 242, 246 described above with reference to FIGS. 2 and 3. In FIG. 4, only a portion of the walls 438a, 438b and channels 442, 446 are illustrated to better show the heating device 422, though it is understood that the walls 438a, 438b and channels 442, 446 can extend from the upstream side 430 to the downstream side 432 similar to the walls 238a, 238b and first and second channels 242, 246 described above with reference to FIGS. 2 and 3. Additionally it is understood that adjacent ones of the first and second channels 442, 446 can be plugged on opposite ends (i.e. at the upstream or downstream sides 430, 432) similar to the first and second channels 242, 246 (FIGS. 2 and 3).

The heating device 422 can include a first lead 450, a second lead 454, and at least one resistance heating element 458, that can be similar to the first lead 250, second lead 254, and resistance heating element 258 described above with reference to FIGS. 2 and 3. The heating device 422 can also include an intermediate lead 460 or additional leads (not shown) that can be similar to the intermediate lead 260 and additional leads (not shown) described above with reference to FIG. 3.

FIG. 4 illustrates additional non-limiting examples of pathways and locations of the first, second, and intermediate leads 450, 454, 460 and the resistance heating elements 458. The resistance heating elements 458 can be located in clusters or zones within the substrate body 418. In the example provided, first, second, and third zones 462, 464, 466 are illustrated, though more or less zones can be used. The locations of the zones 462, 464, 466 are illustrated for example purposes and it is understood that the zones 462, 464, 466 or other zones (not shown) can be positioned at any location within the substrate body 418.

In the example provided, a first portion or branch 468 of the first lead 450 can extend inward from the perimeter 426 to a first location 470 in one of the walls 438a, 438b. From the first location 480, the first branch 468 can extend within or on the walls 438a, 438b generally axially with regards to the flow axis 434. A first portion or branch 472 of the second lead 454 can extend generally inward from the perimeter 426 to a second location 474 in one of the walls 438a, 438b and then generally axially with regards to the flow axis 434. A plurality of the resistance heating elements 458 can extend within or on the walls 438a, 438b between the first branches 468, 472 to electrically couple the first and second leads 450, 454. In the example provided, the resistance heating elements 458 that couple the first branches 468, 472 can be in an electrically parallel configuration and can define the first zone 462, though other configurations can be used.

In the example provided, a second portion or branch 476 of the first lead 450 can extend inward from the perimeter 426 to a third location 478 in one of the walls 438a, 438b. From the third location 478, the second branch 476 can extend within or on the walls 438a, 438b generally axially with regards to the flow axis 434. A second portion or branch 480 of the second lead 454 can extend generally inward from the perimeter 426 to a fourth location 482 in one of the walls 438a, 438b and then generally axially with regards to the flow axis 434. A plurality of the resistance heating elements 458 can extend within or on the walls 438a, 438b between the second branches 476, 480 to electrically couple the first and second leads 450, 454. In the example provided, the resistance heating elements 458 that couple the second branches 476, 480 can be in an electrically parallel configuration and can define the second zone 464, though other configurations can be used.

In the example provided, a third portion or branch 484 of the first lead 450 can extend inward from the perimeter 426 to a fifth location 486 in one of the walls 438a, 438b. From the fourth location 482, the third branch 484 can extend within or on the walls 438a, 438b generally axially with regards to the flow axis 434. A third portion or branch 488 of the second lead 454 can extend generally inward from the perimeter 426 to a sixth location 490 in one of the walls 438a, 438b and then generally axially with regards to the flow axis 434. A plurality of the resistance heating elements 458 can extend within or on the walls 438a, 438b between the third branches 484, 488 to electrically couple the first and second leads 450, 454. In the example provided, the resistance heating elements 458 that couple the second branches 476, 480 can include a first set 492 and a second set 494 of resistance elements. The first and second sets 492, 494 can be spaced apart and can be electrically coupled in series by the intermediate leads 460, though other configurations can be used. The first and second sets 492, 494 can define the third zone 466, though other configurations can be used.

In the example provided, the first, second, and third zones 462, 464, 466 are electrically in parallel, though other configurations can be used. For example the first, second, or third zones 462, 464, 466 and/or additional zones (not shown) could be connected in series with each other. It is also understood that the first, second, and third zones 462, 464, 466 can have separate leads (not shown) that can be independently coupled to the power source (e.g. power source 262 of FIG. 2) such that the first, second, and third zones 462, 464, 466 can be independently controlled.

Figure 5:
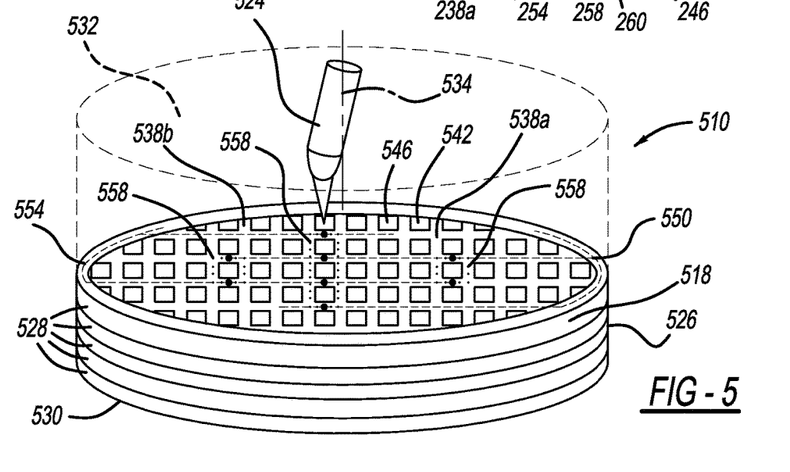
FIG. 5 is a perspective view of a portion of another exhaust system device similar to the exhaust system devices of FIGS. 2 and 4, illustrating a portion of a three-dimensional printer.

With additional reference to FIG. 5, a portion of an exhaust device 510 that can be similar to the exhaust device 210, 410 (FIGS. 2-4), or either of the catalytic converter 62 (FIG. 1) or the particulate filter 66 (FIG. 1) is illustrated. The exhaust device 510 can include a substrate body 518 and a heater device 522. In FIG. 5, a portion of a three-dimensional printer 524 is also illustrated. The substrate body 518 and heater device 522 can be similar to the substrate bodies 218, 418 and heater devices 222, 422 described above with reference to FIGS. 2-4. The substrate body 518 can have a perimeter 526, an upstream side 530, a downstream side 532 and a flow axis 534, similar to the perimeter 226, 426, upstream side 230, 430, downstream side 232, 432, and flow axis 234, 434 described above with reference to FIGS. 2-4. The substrate body 518 can include a plurality of walls 538*a*, 538*b* that define a plurality of first and second channels 542, 546, that can be similar to the walls 238*a*, 238*b* and first and second channels 242, 246 described above with reference to FIGS. 2 and 3.

The substrate body 518 and heater device 522 can be "printed" three-dimensionally by the three-dimensional printer 524. The three-dimensional printer 524 can selectively deposit substrate particles (e.g. cordierite particles) that make up the substrate body 518 and walls 538*a*, 538*b*. The three-dimensional printer 524 can deposit these substrate particles layer by layer (e.g. shown as layers 528). The substrate particles can be mixed with a bonding agent (e.g. an adhesive) to bond the individual substrate particles together and to preceding layers 528 in order to form each subsequent layer 528.

The three-dimensional printer 524 can selectively deposit electrically conductive or resistive particles that make up the first lead 550, second lead 554, intermediate leads 560, and resistance heating elements 558. The three-dimensional printer 524 can deposit these electrically conductive or resistive particles layer by layer (e.g. layers 528) and interspersed with the substrate particles to form the continuous wire-like structures of the leads 550, 554, 560 and resistance heating elements 558. The three-dimensional printer 524 can deposit the conductive or resistive particles such that the leads 550, 554, 560 and resistance heating elements 558 can extend in any suitable direction and can be fully encased or surrounded by the walls 538*a*, 538*b*. Thus, the resistance heating elements 558 can be positioned to heat zones (e.g. zones 462, 464, 466; shown in FIG. 4) at any location within the substrate body 518 and of any size including as small as a single wall 538*a*, or 538*b* or a portion of a single channel 542, 546. Furthermore, the electrically conductive elements (e.g. leads 550, 554, 560, and resistance heating elements 558) can be encased by the walls 538*a*, 538*b* to prevent electrical conduction through a metallic catalytic coating (not specifically shown).

Thus, the three-dimensional printer can manufacture the substrate body 518 by way of a method that includes first depositing a first one of the layers 528 of the substrate body, then depositing a second one of the layers 528, followed by depositing sequential ones of the layers 528 until the substrate body 518 is formed. The step of depositing the first layer of the substrate body 518 can include depositing a first layer of substrate particles (not specifically shown) and a first layer of conductive particles (not specifically shown) in predetermined discrete locations (e.g. corresponding to walls 538*a*, 538*b*, leads 550, 554, and resistance heating elements 558).

The step of depositing the second layer of the substrate body 518 can include depositing a second layer of substrate particles (not specifically shown) and a second layer of conductive particles (not specifically shown) in predetermined discrete locations (e.g. corresponding to walls 538*a*, 538*b*, leads 550, 554, and resistance heating elements 558). Then subsequent layers of the substrate body 518 can be deposited similar to the first and second layers, though it is appreciated that some layers of the substrate body 518 can be devoid of the conductive particles (not specifically shown). The layers of substrate particles (not specifically shown) can cooperate to define the walls 538*a*, 538*b* and channels 542, 546. The layers of the conductive particles (not specifically shown) can cooperate to define the (leads 550, 554, and resistance heating elements 558).

While the three-dimensional printer 524 is illustrated as printing the layers 528 sequentially along the flow axis 534 (i.e. printing the layers 528 sequentially from the upstream side 530 to the downstream side 532), it is understood that the three-dimensional printer 524 could print layers 528 sequentially in other orientations. For example, the layers 528 could be printed sequentially transverse to the flow axis 534 such that each layer 528 spans from the upstream side 530 to the downstream side 532.

Figure 6:
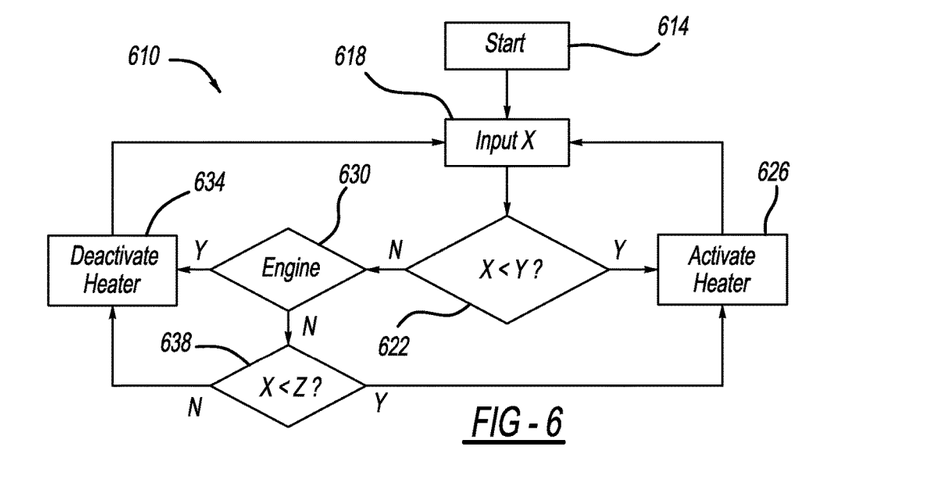
FIG. 6 is a flow chart of a logical routine for controlling conductive elements of an exhaust device.

With reference to FIG. 6, a logic routine 610 for use in controlling a heating device of an exhaust device (e.g. heating device 72, 222, 422, or 522 of exhaust devices 62, 210, 410, or 510 respectively and described above with reference to FIGS. 1-5) is illustrated in flow-chart form. The logic routine 610 can be programmed into a control module (e.g. control module 86, 266 described above with reference to FIGS. 1 and 2) and used to control the operation of the heating devices 72, 222, 422, 522 (FIGS. 1-5). The logic routine 610 can begin at step 614. From step 614, the logic routine can proceed to step 618.

At step 618, the control module 86, 266 (FIGS. 1 and 2) can receive input signals (i.e. temperature X) from one or more sensors (e.g. sensors 88, 80, or 92 described above with reference to FIG. 1). The temperature X can be a temperature of the exhaust gasses or of the exhaust device 62, 210, 410, 510 for example. Alternatively, the temperature X can be a temperature of a specific area or zone of the exhaust device 62, 210, 410, 510 (e.g. zone 462, 464, 466 described above with reference to FIG. 4). Alternatively, since resistance of an electrically conductive element (e.g. resistance heating element 258, 458, 558 of FIGS. 2-5) can change based on the temperature of that element through a known relationship, the electrically conductive elements in the substrate body 80, 218, 418, 518 can act as the sensor to determine the temperature X. Thus, the control module 86, 266 can use this known relationship (e.g. via a look-up table or equation) to determine the temperature X based on the resistance of the electrically conductive elements (resistance heating element 258, 458, 558 of FIGS. 2-5) in the exhaust device 62, 210, 410, 510. This known relationship can also be used to determine if any portion of the substrate, and the electrically conductive elements (e.g. resistance heating element 258, 458, 558, of FIGS. 2-5) encased therein, have been cracked or damaged since the resistance will be different than expected. After receiving the temperature X at step 618, the logic routine 610 can proceed to step 622.

At step 622, the control module 86, 266 (FIGS. 1 and 2) can check if the temperature X is less than a first predetermined temperature Y. The first predetermined temperature Y can be a light-off temperature of the catalyst of the exhaust device 62, 210, 410, 510 (FIGS. 1-5). The light-off temperature can be the temperature at which the exhaust device 62, 210, 410, 510 (FIGS. 1-5) efficiently catalyzes chemical reactions between undesirable exhaust emissions (e.g. carbon monoxide "CO", unburned hydrocarbons "HC", nitrogen oxides "NOx") to create more desirable emissions (e.g. carbon dioxide "CO2", water "H2O", nitrogen gas "N2"). If the temperature X is less than the first predetermined temperature Y (e.g. light-off temperature), then the logic routine 610 can proceed to step 626.

At step 626, the control module 86, 266 (FIGS. 1 and 2) can activate the heating device 72, 222, 422, 522 (FIGS. 1-5) to raise the temperature of the exhaust device 62, 210, 410, 510 (FIGS. 1-5). Alternatively, the control module 86, 266 (FIGS. 1 and 2) can activate specific zones (e.g. zone 462, 464, 466; FIG. 4) of the heating device 72, 222, 422, 522 (FIGS. 1-5). After activating the heating device 62, 210, 410, 510 (FIGS. 1-5), the logic routine 610 can proceed back to step 618.

Returning to step 622, if the temperature X is not less than the first predetermined temperature Y, then the logic routine 610 can proceed to step 630.

At step 630, the control module 86, 266 (FIGS. 1 and 2) can determine whether a condition of the ICE 14 (FIG. 1) is met. The condition of the ICE 14 (FIG. 1) can be met if the ICE 14 (FIG. 1) is operating. Alternatively, the condition of the ICE 14 (FIG. 1) can be met if the temperature of the exhaust gasses is such that the temperature of the exhaust device 62, 210, 410, 510 (FIGS. 1-5) will stay at or above the first predetermined temperature Y without the heating device 72, 222, 422, 522 (FIGS. 1-5) being active. If the engine condition is met, then the logic routine 610 can proceed to step 634.

At step 634, the control module 86, 266 (FIGS. 1 and 2) can deactivate the heating device 72, 222, 422, 522 (FIGS. 1-5). After deactivating the heating device 72, 222, 422, 522 (FIGS. 1-5), the logic routine 610 can return to step 618.

Returning to step 630, if the engine condition is not met, then the logic routine 610 can proceed to step 638. At step 638, the control module 86, 266 (FIGS. 1 and 2) can check if the temperature X is less than a second predetermined temperature Z. The second predetermined temperature Z can be greater than the first predetermined temperature Y. If the temperature X is less than the second predetermined temperature Z, then the logic routine 610 can proceed to step 626 to activate the heating device 72, 222, 422, 522 (FIGS. 1-5) to keep the temperature of the exhaust device 62, 210, 410, 510 (FIGS. 1-5) above the first predetermined temperature Y.

Returning to step 638, if the temperature X is not less than the second predetermined temperature Z, then the logic routine 610 can proceed to step 634.

Figure 7:
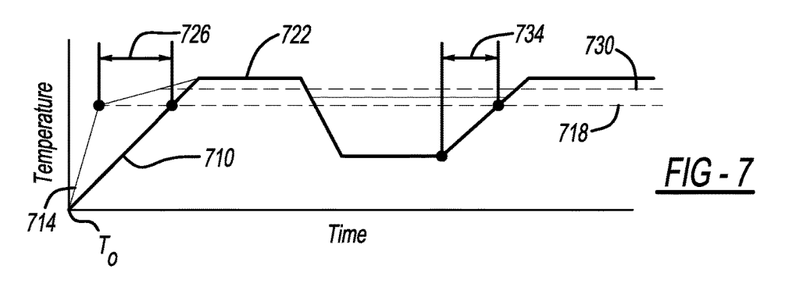
FIG. 7 is a graph comparing a temperature of an exhaust device substrate when heated according to the logic routine of FIG. 6, to a temperature of an exhaust device substrate when heated with conventional engine management methods.

With additional reference to FIG. 7, a first temperature 710 and a second temperature 714 of an exhaust device (e.g. exhaust devices 62, 210, 410, or 510 described above with reference to FIGS. 1-5) are graphed over time. The first temperature 710 can be the temperature of the exhaust device 62, 210, 410, 510 (FIGS. 1-5) in a construction such that the heating device 72, 222, 422, 522 (FIGS. 1-5) is not included. In other words, the first temperature 710 can be representative of the temperature of the exhaust device 62, 210, 410, 510 (FIGS. 1-5) when heated using conventional engine management methods described below. The second temperature 714 can be the temperature of the exhaust device 62, 210, 410, 510 (FIGS. 1-5) in a construction such that the heating device 72, 222, 422, 522 (FIGS. 1-5) is activated according to the logic routine 610 (FIG. 6). Thus the second temperature 714 can be the temperature X (FIG. 6).

In the example provided, the first and second temperatures 710, 714 can begin at the same temperature value T_0, which can be less than a light-off temperature 718 of the catalyst in the exhaust device 62, 210, 410, 510 (FIGS. 1-5) in the case of a cold-start condition of the ICE 14 (FIG. 1).

As the ICE 14 (FIG. 1) warms up over time, the exhaust gasses heat the exhaust device 62, 210, 410, 510 (FIGS. 1-5). The first temperature 710 can increase over time until reaching the light-off temperature value 718. Typically, extra fuel is supplied to the ICE 14 (FIG. 1) to cause the ICE 14 (FIG. 1) to run warmer than normal operating conditions. The heat from the exhaust gasses can continue to raise the first temperature 710 until a steady state temperature value 722 is reached.

At a later time, the ICE 14 (FIG. 1) can be turned off or operation can decrease, to cause the first temperature 710 to decrease below the light-off temperature value 718. When the ICE 14 (FIG. 1) is turned back on, or operation increases, the first temperature 710 takes time to increase back to the light-off temperature value 718. Thus, without the heating device 72, 222, 422, 522 (FIGS. 1-5) the temperature of the exhaust device 62, 210, 410, 510 (FIGS. 1-5) can dip below the light-off temperature 718 when the engine temporarily shuts off or decreases power output (e.g. to conserve fuel when the vehicle is stopped, or to be operated on battery power such as with an electric-hybrid vehicle).

In comparison, the heating device 72, 222, 422, 522 (FIGS. 1-5) can increase the temperature of the exhaust device 62, 210, 410, 510 (i.e. second temperature 714) much more rapidly than without the heating device 72, 222, 422, 522 (i.e. first temperature 710). Additionally, the heat from the heating device 72, 222, 422, 522 (FIGS. 1-5) can combine with the heat from the warming up ICE 14 (FIG. 1) to heat up the exhaust device 62, 210, 410, 510 more quickly. Thus, the second temperature 714 can reach the light-off temperature value 718 before the first temperature 710 and without the need for extra fuel consumption that is typically used to cause the ICE 14 (FIG. 1) to run warmer. The difference in time to initially reach the light-off temperature 718 is indicated by arrows 726.

The light-off temperature 718 can be the same as the first predetermined temperature Y (FIG. 6). After the second temperature 714 reaches the light-off temperature 714, the heating device 72, 222, 422, 522 (FIGS. 1-5) can be shut off if the ICE 14 (FIG. 1) alone would be sufficient to keep the temperature of the exhaust device 62, 210, 410, 510 (FIGS. 1-5) above the light-off temperature 718, as described with reference to step 630 of FIG. 6.

The heat from the ICE 14 (FIG. 1) can raise the second temperature 714 to the steady state temperature value 722, which can be greater than a predetermined temperature value 730. The predetermined temperature value 730 can be greater than the light-off temperature 718 and can be the same as the second predetermined temperature value Z of FIG. 6.

When the ICE 14 (FIG. 1) is turned off, or power diminished, the second temperature 714 can decrease. As described with reference to step 638 of FIG. 6, if the second temperature 714 decreases below the predetermined temperature value 730, then the heating device 72, 222, 422, 522 (FIGS. 1-5) can maintain the first temperature 710 above the light-off temperature value 718 and below the predetermined value 730.

When the ICE 14 (FIG. 1) is turned back on, or power increases, the heating device 72, 222, 422, 522 (FIGS. 1-5) can be turned off and the heat from the exhaust gasses can again maintain the second temperature 714 above the light-off temperature 718. Thus, the second temperature 714 can remain at or above the light-off temperature value 718 without the need for extra fuel consumption that is typically used to cause the ICE 14 (FIG. 1) to run warmer.

The time that the exhaust device 62, 210, 310, 410, 510 (FIGS. 1-5) would otherwise be below the light-off temperature value 718 is indicated by arrows 734. Thus, the total amount of time that the heating device 72, 222, 422, 522 (FIGS. 1-5) can reduce undesirable emissions and increase fuel economy is the sum of the times 726, 734. Since some ICEs 14 (FIG. 1) are configured to shut off under certain frequently occurring conditions (e.g. when the vehicle is stopped, or is coasting, or when the vehicle is propelled by electric power), the reduction in undesirable emissions and increase in fuel economy can be significant.

Figure 8:
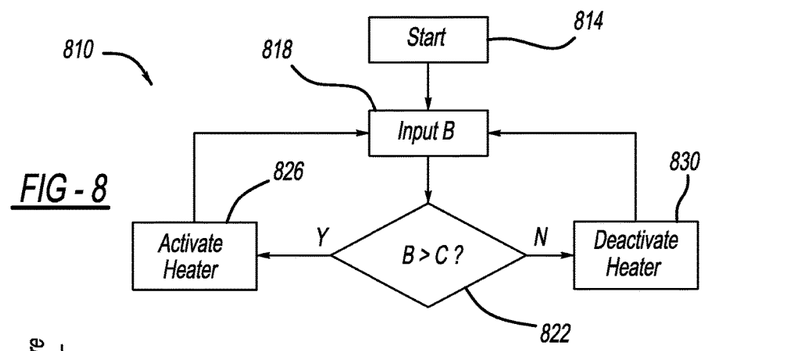
FIG. 8 is a flow chart of another logical routine for controlling conductive elements of an exhaust device.

With additional reference to FIG. 8, a logic routine 810 for use in controlling a heating device of an exhaust device (e.g. heating device 82, 222, 422, or 522 of exhaust devices 66, 210, 410, or 510 respectively and described above with reference to FIGS. 1-5) is illustrated in flow chart form. The logic routine 810 can be programmed into a control module (e.g. control module 86, 266 described above with reference to FIGS. 1 and 2) and used to control the operation of the heating devices 82, 222, 422, 522 (FIGS. 1-5). The logic routine 810 can begin at step 814. From step 814, the logic routine can proceed to step 818.

At step 818, the control module 86, 266 (FIGS. 1 and 2) can receive input signals (i.e. pressure B) from one or more sensors (e.g. sensors 88, 80, or 92 described above with reference to FIG. 1). The pressure B can be a pressure of the exhaust gasses before, after, or within the exhaust device 66, 210, 410, 510 (FIGS. 1-5), or a pressure difference of across the exhaust device 66, 210, 410, 510 (FIGS. 1-5) for example. Alternatively, the pressure B can be a pressure of a specific area or zone of the exhaust device 66, 210, 410, 510 (e.g. zone 462, 464, 466 described above with reference to FIG. 4). After receiving the pressure B at step 818, the logic routine 810 can proceed to step 822.

At step 822, the control module 86, 266 (FIGS. 1 and 2) can check if the pressure B is greater than a predetermined pressure C. If the pressure B is greater than the predetermined pressure C, then the logic routine 810 can proceed to step 826.

At step 826, the control module 86, 266 (FIGS. 1 and 2) can activate the heating device 82, 222, 422, 522 (FIGS. 1-5) to raise the temperature of the exhaust device 66, 210, 410, 510 (FIGS. 1-5) above a light-off temperature of particulate matter. Alternatively, the control module 86, 266 (FIGS. 1 and 2) can activate certain zones (e.g. zones 462, 464, 466 described above with reference to FIG. 4) of the heating device 82, 222, 422, 522 (FIGS. 1-5). Raising the temperature above the light-off temperature can burn off particulate matter that collects in the exhaust device 66, 210, 410, 510 (FIGS. 1-5). Burning off the particulate matter can cause the pressure B to decrease as less particulate matter then blocks the flow of exhaust gasses. After burning off the particulate matter, the logic routine 810 can return to step 818.

Returning to step 822, if the pressure B is not greater than the predetermined pressure C, then the logic routine 810 can proceed to step 830. At step 830, the control module 86, 266 (FIGS. 1 and 2) can de-activate the heating device 82, 222, 422, 522 (FIGS. 1-5). After deactivating the heating device 82, 222, 422, 522 (FIGS. 1-5), the logic routine 810 can return to step 818.

Figure 9:
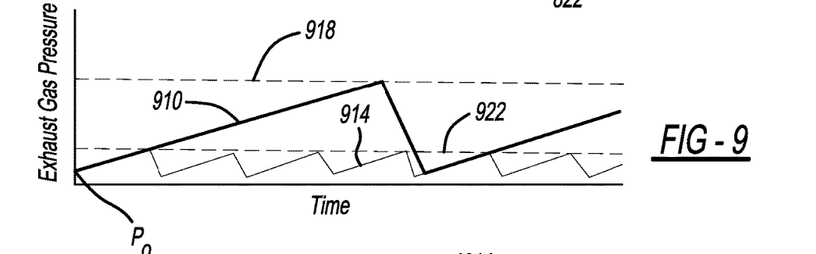
FIG. 9 is a graph comparing a pressure of an exhaust device when heated according to the logic routine of FIG. 8, to a pressure of an exhaust device heated with conventional engine management methods.

With additional reference to FIG. 9, a first exhaust pressure 910 and a second exhaust pressure 914 of an exhaust device (e.g. exhaust devices 66, 210, 410, or 510 described above with reference to FIGS. 1-5) are graphed over time. The first exhaust pressure 910 can be a pressure of the exhaust gasses before, or within the exhaust device 66, 210, 410, 510 (FIGS. 1-5) in a construction such that the heating device 82, 222, 422, 522 (FIGS. 1-5) is not included. In other words, the first exhaust pressure 910 can be representative of the pressure when the exhaust device 66, 210, 410, 510 (FIGS. 1-5) is heated using conventional engine management methods described below. The second exhaust pressure 914 can be a pressure of the exhaust gasses before, or within the exhaust device 66, 210, 410, 510 (FIGS. 1-5) in a construction such that the heating device 82, 222, 422, 522 (FIGS. 1-5) is activated according to the logic routine 810 (FIG. 6). Thus, the second exhaust pressure 914 can be the pressure B (FIG. 6).

In the example provided, the first and second exhaust pressures 910, 914 can begin at the same pressure value P_0, such as when the exhaust device 66, 210, 410, 510 (FIGS. 1-5) is new with little or no particulate buildup. As the ICE 14 (FIG. 1) operates over time, particulate matter can build up on a substrate of the exhaust device (e.g. substrate body 80, 218, 418, 518 of FIGS. 1-5). This buildup of particulate matter can cause an increase in pressure 910, 914 upstream of the exhaust device 66, 210, 410, 510 (FIGS. 1-5), which can result in less efficient use of fuel within the ICE 14 (FIG. 1).

Typically, in order to reduce this pressure 910, 914 without replacing the exhaust device 66, 210, 410, 510 (FIGS. 1-5), the process of regeneration is used. Typically, in order to raise the temperature of the built up particulate matter, extra fuel is consumed by the ICE 14 (FIG. 1) to cause the exhaust gasses to be warmer than under normal operating conditions until the particulate matter is above the light-off temperature. Since it can be desirable to minimize fuel consumption, ICEs 14 (FIG. 1) are typically configured to only perform regeneration when the exhaust pressure 910 reaches a first predetermined pressure value 918.

During regeneration, the exhaust pressure 910 can decrease. Once the exhaust pressure 910 reaches a value near P_0, the amount of fuel consumed by the ICE 14 (FIG. 1) can return to normal. As the temperature of the exhaust gasses returns to normal operating temperature, the temperature of the exhaust device 66, 210, 410, 510 (FIGS. 1-5) can drop below the light-off temperature and particulate matter can again build up on the exhaust device 66, 210, 410, 510 (FIGS. 1-5).

In comparison, the heating device 82, 222, 422, 522 (FIGS. 1-5) can increase the temperature of the exhaust device 66, 210, 410, 510 (FIGS. 1-5) above the light-off temperature of the particulate matter without the need for extra fuel consumption that is typically used to cause the ICE 14 (FIG. 1) to run warmer. Thus, the heating device 82, 222, 422, 522 (FIGS. 1-5) can trigger regeneration earlier, such that when the second exhaust pressure 914 reaches a second predetermined pressure value 922, that can be significantly lower than the first predetermined pressure value 918, particulate matter can be burned off. The second predetermined exhaust pressure 922 can be the same as the predetermined pressure C of FIG. 8.

Figure 10:
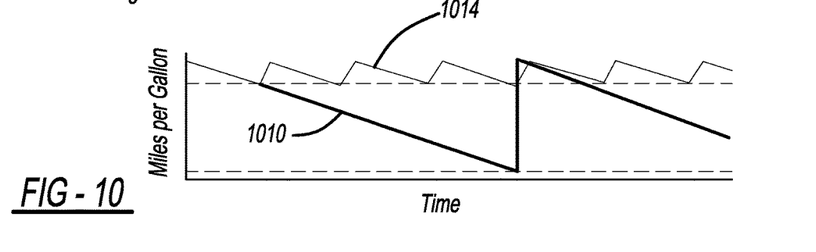
FIG. 10 is a graph comparing a fuel economy of a vehicle when an exhaust device is heated according to the logic routine of FIG. 8, to a fuel economy of a vehicle when an exhaust device is heated with conventional engine management methods.

With additional reference to FIG. 10, the fuel economy (miles per gallon) of the ICE 14 (FIG. 1) is illustrated over time. A first fuel economy that can correspond to use of a typical exhaust device that does not include the heating device 82, 222, 422, 522 (FIGS. 1-5) is illustrated by line 1010. The first fuel economy 1010 can correspond to exhaust pressure 910. A second fuel economy that can occur when the heating device 82, 222, 422, 522 (FIGS. 1-5) is used according to the logic routine 810 is illustrated by line 1014. The second fuel economy 1014 can correspond to exhaust pressure 914. Thus, the heating device 82, 222, 422, 522 (FIGS. 1-5) can cause regeneration more frequently than without the heating device 82, 222, 422, 522 (FIGS. 1-5), which can maintain more consistent and lower exhaust pressures and increase fuel economy of the ICE 14 (FIG. 1).

It is also appreciated that the general thermal conductivity of the leads 250, 254, 450, 454, 550, 554, and the resistance heating elements 258, 458, 558, can permit heat to travel from warmer areas within the exhaust device 62, 66, 210, 410, 510 to cooler areas, which can result in a more even temperature distribution throughout the exhaust device 62, 66, 210, 410, 510 when the heating device 72, 82, 222, 422, 522 is not activated.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. An exhaust system device comprising:
   a substrate body including a plurality of first walls that extend between an upstream end and a downstream end of the substrate body, and a plurality of second walls that are transverse to the first walls and extend between the upstream end and the downstream end, the first and second walls defining a plurality of channels extending between the upstream end and the downstream end;
   electrical leads configured to be coupled to a power source; and
   a plurality of resistance heating elements integrally disposed within at least one of the first or second walls and electrically coupled to the electrical leads to receive power from the electrical leads;
   the plurality of resistance heating elements are spaced apart along lengths of more than one of the plurality of channels to define a plurality of heating zones along lengths of more than one of the plurality of channels;
   wherein at least a portion of each of the electrical leads is fully encased within at least one of the first or second walls; and
   the resistance heating elements are fully encased within at least one of the first or second walls.

2. The device of claim 1, wherein the substrate body includes a catalyst material.

3. The device of claim 1, wherein the substrate body is a particulate filter.

4. The device of claim 1, wherein portions a of the resistance heating element extend parallel to a flow axis of the substrate body.

5. The device of claim 1, wherein portions of the resistance heating element extend transverse to a flow axis of the substrate body.

6. The device of claim 1, wherein each of the electrical leads includes a plurality of branches, each branch being electrically coupled to the resistance heating elements of one of the heating zones.

7. The device of claim 1, further comprising a control module and a sensor, the sensor being configured to sense one of a pressure or a temperature, the control module being configured to control power to the resistance heating elements based on input from the sensor.

8. The device of claim 7, wherein the control module is configured to maintain a temperature of at least a portion of the substrate above a predetermined temperature.

9. The device of claim 1, further comprising a control module and a sensor, the sensor being configured to sense one of a pressure or a temperature, the control module being configured to control power to the resistance heating elements based on input from the sensor and whether a predetermined engine condition is met.

* * * * *

UNITED STATES PATENT AND TRADEMARK OFFICE
CERTIFICATE OF CORRECTION

PATENT NO. : 10,087,799 B2
APPLICATION NO. : 14/789155
DATED : October 2, 2018
INVENTOR(S) : Edward Szczepanski et al.

Page 1 of 1

It is certified that error appears in the above-identified patent and that said Letters Patent is hereby corrected as shown below:

In the Claims

Column 18, Line 7, In Claim 4, after "portions", delete "a"

Signed and Sealed this
Eleventh Day of June, 2019

Andrei Iancu
*Director of the United States Patent and Trademark Office*